United States Patent
Jouve

(10) Patent No.: US 9,796,312 B2
(45) Date of Patent: Oct. 24, 2017

(54) METHOD FOR MANUFACTURING AN INTERIOR TRIM PART OF AN AUTOMOTIVE VEHICLE COMPRISING A VELVET FONT LAYER AND ASSOCIATED PART

(71) Applicant: Faurecia Automotive Industrie, Nanterre (FR)

(72) Inventor: Mathieu Jouve, Volgelsheim (FR)

(73) Assignee: Faurecia Automotive Industrie, Nanterre (FR)

( * ) Notice: Subject to any disclaimer, the term of this patent is extended or adjusted under 35 U.S.C. 154(b) by 206 days.

(21) Appl. No.: 14/634,748

(22) Filed: Feb. 28, 2015

(65) Prior Publication Data

US 2015/0251581 A1 Sep. 10, 2015

(30) Foreign Application Priority Data

Mar. 5, 2014 (FR) .................................... 14 51788

(51) Int. Cl.

| D04H 1/488 | (2012.01) |
|---|---|
| D04H 1/485 | (2012.01) |
| B60N 3/04 | (2006.01) |
| D06N 7/00 | (2006.01) |
| D04H 1/541 | (2012.01) |
| D04H 1/542 | (2012.01) |
| D04H 1/544 | (2012.01) |
| D04H 1/60 | (2006.01) |
| D04H 11/08 | (2006.01) |
| B32B 5/06 | (2006.01) |
| B32B 7/02 | (2006.01) |
| B32B 27/12 | (2006.01) |
| B32B 27/36 | (2006.01) |

(52) U.S. Cl.
CPC ............... *B60N 3/048* (2013.01); *B32B 5/06* (2013.01); *B32B 7/02* (2013.01); *B32B 27/12* (2013.01); *B32B 27/36* (2013.01); *B60N 3/042* (2013.01); *D04H 1/485* (2013.01); *D04H 1/488* (2013.01); *D04H 1/541* (2013.01); *D04H 1/542* (2013.01); *D04H 1/544* (2013.01); *D04H 1/60* (2013.01); *D04H 11/08* (2013.01); *D06N 7/0065* (2013.01); *D06N 7/0071* (2013.01); *B32B 2262/0253* (2013.01); *B32B 2262/0261* (2013.01); *B32B 2262/0276* (2013.01); *B32B 2272/00* (2013.01); *B32B 2307/554* (2013.01); *B32B 2307/584* (2013.01); *D06N 2201/10* (2013.01); *D06N 2213/02* (2013.01); *Y10T 428/2395* (2015.04)

(58) Field of Classification Search
CPC .............................. D04H 1/485; D04H 1/488
See application file for complete search history.

(56) References Cited

U.S. PATENT DOCUMENTS 2,543,101 A * 2/1951 Francis, Jr. ............ D21H 27/34
112/80.7

* cited by examiner

*Primary Examiner* — Jeff Aftergut
(74) *Attorney, Agent, or Firm* — Reising Ethington P.C.

(57) ABSTRACT

An interior trim part made by a method that includes the steps of bringing a fiber web onto a conveyor, needlepunching the fiber web to form a base in contact with the conveyor, and introducing a binder component on the base. The binder component introduced on the base is a thermoplastic polymer in solid form. The method includes a step for heating the base to cause the thermoplastic polymer making up the binder component to penetrate the base over a thickness smaller than the thickness of the base.

11 Claims, 2 Drawing Sheets

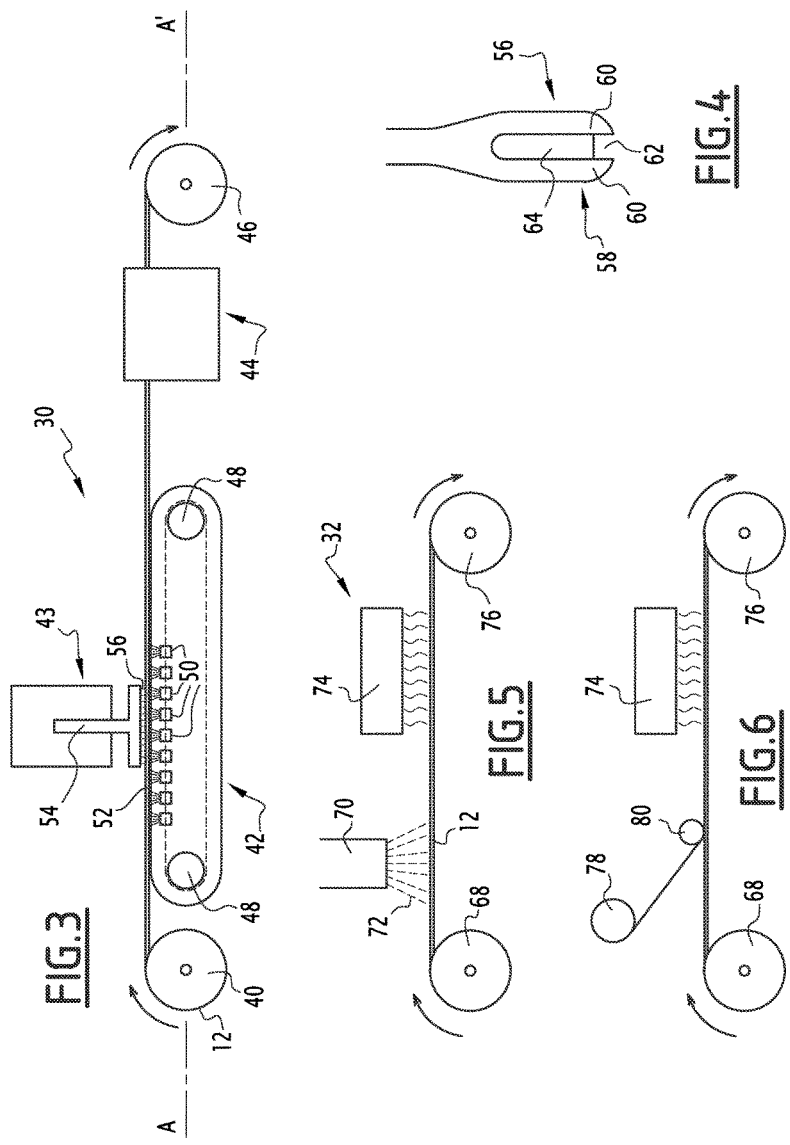

METHOD FOR MANUFACTURING AN INTERIOR TRIM PART OF AN AUTOMOTIVE VEHICLE COMPRISING A VELVET FONT LAYER AND ASSOCIATED PART

TECHNICAL FIELD

The present invention relates to a method for manufacturing an interior trim part of an automotive vehicle, comprising the following steps:
- bringing a fiber web onto a conveyor equipped with brushes, the fiber web comprising base fibers;
- needlepunching the fiber web opposite the brushes to form a base in contact with the conveyor and a velvet font layer opposite the conveyor;
- thermobonding the fiber web;
- introducing a binder component on the base.

BACKGROUND

Such a part is for example designed to form a floor covering carpet in a motor vehicle.

The carpets used in automobiles as floor coverings are essentially needlepunched mats of the "flat needlepunched" or "Dilour™" needlepunched type.

These mats belong to the nonwoven family. They are preferable to traditional woven coverings, because they are deformable and can hug the shapes of vehicle floors.

This "shaping" of floor mats to hug the configuration of vehicle floors occurs during the thermoforming operation. Since these mats are generally associated with sublayers (heavy mass or felts) to create an acoustic complex allowing sound insulation or absorption, thermoforming takes place at the softening temperature of those sublayers (for example, beginning at 110° C. if the sublayer is a polyolefin-based heavy mass).

The "Dilour™" needlepunched products are also called "velvet needlepunch", since their surface appearance is similar to that of velvet. This "velvet" in the case at hand is made up of randomly distributed fibers. These fibers may be in the form of loops or individual fibers (trimmed loops).

These mats are formed from a web of fibers (called precursor web and having undergone a first needlepunching, called pre-needlepunching), for example on a Dilour™ machine made up of a conveyor equipped with a set of brushes and a needlepunching head equipped with needle boards (also called combs) of the "crown" type optionally completed by "fork" needles.

Crown-type needles, which generally have a triangular section, have a single barb per edge positioned just in front of the tip of the needle at a same distance from the tip. These barbs are thus positioned to drive the fibers while forming loops of equal lengths. Furthermore, the barbs being situated on the side, they can grasp the fibers in the entire thickness of the precursor web. This type of needle therefore allows a maximum velvet output.

Nevertheless, because the barbs are situated on the edges, they are shallow and the number of fibers driven per movement is small. To form the velvet, a large number of penetrations are therefore required, i.e., a high needlepunching density, which is detrimental to productivity.

Fork needles have a circular section and have no tip, but an end in the shape of a fork (upside down U). They can only drive fibers situated essentially on the back of the precursor web (where they penetrate), but in larger number than crown needles, because the dimensions of the fork are much larger than those of a barb.

Nevertheless, these needles are much more aggressive (they break some of the fibers that they encounter). Using them in large number is therefore considered to be detrimental to the planar cohesion of the Dilour™ needlepunch, and therefore its ability to deform without tearing during thermoforming.

That is why it is preferred to combine these two types of needles to obtain both acceptable velvet output and productivity, without being too detrimental to the planar cohesion. Thus, there are for example combs made up of half crown needles and half fork needles.

These needles drive part of the fibers of the web inside the brushes of the conveyor, over a depth that will correspond to the height of the finished produced velvet.

Simultaneously with the establishment of the velvet, needlepunching makes the web denser by contributing to trimming the fibers in the part of the web remaining on the surface of the brushes (called "base"). In other words, the thickness of the base is reduced as the fibers mix together.

The height of the velvet generally varies between 2 mm and 5 mm, the thickness of the base varying from 1 mm to 3 mm, while the thickness of the precursor web is approximately 5 to 10 mm.

When the velvet is trimmed (in a step immediately following the "Dilour processing", the height of the velvet loops being shaved), the fibers making up the velvet assume the shape of a U, the base of the U being located in the base. Hereinafter, it will be considered that the fibers of the velvet advantageously assume this form.

Next, the mats formed by needlepunching are consolidated by a resin that binds the fibers to each other in the base. In fact, the mechanical cohesion that they receive due to the needlepunching is insufficient to guarantee proper performance during use, once installed in the vehicle (in particular resistance to abrasion, filamentation, etc.).

These resins are typically latexes of the SBR (Styrene Butadiene Rubber) type and are applied on the backside of the mat in the form of an aqueous dispersion using known coating means, followed by expression to cause the dispersion to penetrate the base. The mats are next dried in furnaces to evacuate the water. The surface mass of the dry latex extract remaining in the base after drying represents between 15 and 30% of the surface density of the web.

Using latex has drawbacks, because the penetration of the dispersion inside the base is difficult to control (in no case may it pass through the base, which would pollute the fibers and the velvet), in part due to capillarity phenomena caused in the fibrous network, which is inherently random. Furthermore, latexes are thermohardened (or cross-linked) polymers that are difficult to recycle, and the latex residues must be stored, since they are potentially hazardous for the environment.

To offset these problems, it is known to use, in place of the latex, thermofusible fibers that are dispersed in the web of fibers and that are melted after needlepunching. These fibers can be single-component fibers (with a base of a same polymer) or bi-component fibers (for example of the body and core type, where the body is made up of a polymer having a melting temperature lower than that of the polymer making up the core). The polymer with a low melting point most generally used is polyethylene PE, the melting temperature of which varies from 90° C. to 120° C.

To obtain bonding similar to that of latex, it is necessary to introduce a large quantity of thermofusible fibers into the web, as described in EP 518,690. This increases the cost of the product (fusible fibers generally being more expensive than standard fibers). This introduction is also detrimental to its surface appearance, given the appearance of mottling on the velvet layer after thermoforming.

In fact, needlepunching in the Dilour™ machine indifferently drives the base fibers and the binder fibers, which are therefore found in equal proportions in the velvet and the precursor web. However, the thermoforming is done at a temperature close to the melting temperature of the binder fibers, such that the binder fibers present in the velvet can stick the base fibers of the velvet to each other and prevent them from straightening after crushing caused by closing the thermoforming mold.

In order to offset this problem, EP 2,286,012 describes a method in which a first web comprising thermofusible fibers is used to form the base and a second web with no thermofusible fibers is used to form the finished layer, the webs being assembled together during needlepunching of the second web.

The implementation of such a method requires a machine comprising two needlepunching heads positioned on a same conveyor, which requires a significant investment, and can complicate the implementation of the method.

EP 2,664,702 describes a method in which a mat is obtained by needlepunching, then consolidated using a latex layer. The mat comprises binder fibers with a high weight percentage, as indicated in the EP 518,690.

A layer of adhesive, for example made from a thermoplastic polymer, is adhered to the back of the mat, to allow bonding with a substrate (generally performing an acoustic function) or to allow improved rigidity of the mat that is essential to mount the mat in the vehicle. This layer does not penetrate the web of needlepunched fibers.

SUMMARY

One aim of the invention is to provide a lower-cost method, using simple equipment, for obtaining interior trim parts having a very satisfactory velvet finishing layer and adequate mechanical strength, without using latex.

To that end, there is provided in accordance with an aspect of the invention a method of the aforementioned type, characterized in that the web of fibers comprises a quantity of strictly more than 0 wt % and of less than 15 wt % of at least partially fusible binder fibers, the binder component introduced on the base being a thermoplastic polymer in solid form, the method comprising a step for heating the base after applying the thermoplastic polymer making up the binder component to cause the thermoplastic polymer making up the binder component to penetrate the base over a thickness smaller than the thickness of the base.

The method according to an aspect of the invention may comprise one or more of the following features, considered alone or according to any possible combination:
 the binder fibers comprise bi-component fibers comprising a core and an envelope surrounding the core, the melting point of the envelope being lower than that of the core, or fibers having a melting point lower than the melting point of the base fibers of the fiber web;
 the thermoplastic polymer making up the binder component is introduced in the form of a powder, film, nonwoven, plastisol and/or organosol;
 the base fibers are formed with a base of thermoplastic polymer of the same nature as the thermoplastic polymer making up the binder component, the heating step comprising partial melting of the thermoplastic polymer of the base fibers in the base, with no significant melting of the thermoplastic polymer of the base fibers on the font layer;
 the base fibers are formed with a base of a polymer, the thermoplastic polymer making up the binder component having a melting point below the melting point of the polymer of the base fibers;
 the melt flow index of the thermoplastic polymer making up the binder component is comprised between 50 g/10 mn and 70 g/10 mn;
 the thermobonding of the web of fibers is done before introducing the thermoplastic polymer making up the binder component on the base;
 the maximum penetration thickness of the thermoplastic polymer making up the binder component in the base after at least partial melting is less than 30% of the thickness of the base and is advantageously greater than 10% of the thickness of the base;
 the needlepunching comprises piercing the fiber web using a majority of fork needles, advantageously using a comb provided with at least 80% fork needles.

The invention also relates to an interior trim part of a motor vehicle, comprising a web of needlepunched fibers comprising base fibers forming a velvet font layer and a base, and a binder component arranged in the base, characterized in that the fiber web comprises a quantity of strictly more than 0 wt % and of less than 15 wt % of binder fibers that are at least partially fusible. The binder component arranged in the base is a melted solid thermoplastic polymer having penetrated the base over a thickness smaller than the thickness of the base.

This interior trim part may include one or more of the following features, considered alone or according to any technically possible combination:
 the binder fibers comprise bi-component fibers comprising a core and an envelope surrounding the core, the melting point of the envelope being lower than that of the core, or fibers having a melting point lower than the melting point of the base fibers of the fiber web;
 the maximum penetration thickness of the thermoplastic polymer making up the binder component in the base after at least partial melting is less than 30% of the thickness of the base and is advantageously more than 10% of the thickness of the base;
 the melt flow index of the thermoplastic polymer making up the binder component is comprised between 50 g/10 mn and 70 g/10 mn;
 the base fibers are formed with a base of a thermoplastic polymer of the same nature as the thermoplastic polymer making up the binder component, the thermoplastic polymer of the base fibers in the base being at least partially melted, with no significant melting of the thermoplastic polymer of the base fibers on the font layer;
 the base fibers are formed with a base of a polymer, the thermoplastic polymer making up the binder component having a melting point lower than the melting point of the polymer of the base fibers.

BRIEF DESCRIPTION OF THE DRAWINGS

The invention will be better understood upon reading the following description, provided solely as an example and done in reference to the appended drawings, in which:

FIG. 3 is a diagrammatic view, in partial cross-section, of a needlepunching station of an installation for carrying out the manufacturing method of FIG. 2;

FIG. 4 is a view of the free end of a needle used in the needlepunching station of FIG. 3;

FIG. 5 is a diagrammatic view, in partial cross-section, of a station for depositing and melting a powdered thermoplastic polymer in the installation for carrying out the manufacturing method of FIG. 2; and FIG. 6 is a view similar to FIG. 5, in which the thermoplastic polymer is deposited in the form of a film or a nonwoven.

DETAILED DESCRIPTION OF ILLUSTRATED EMBODIMENTS

In the rest of the description, the terms "upstream" and "downstream" are to be generally understood relative to the normal flow direction in the described manufacturing method.

Figure 1:
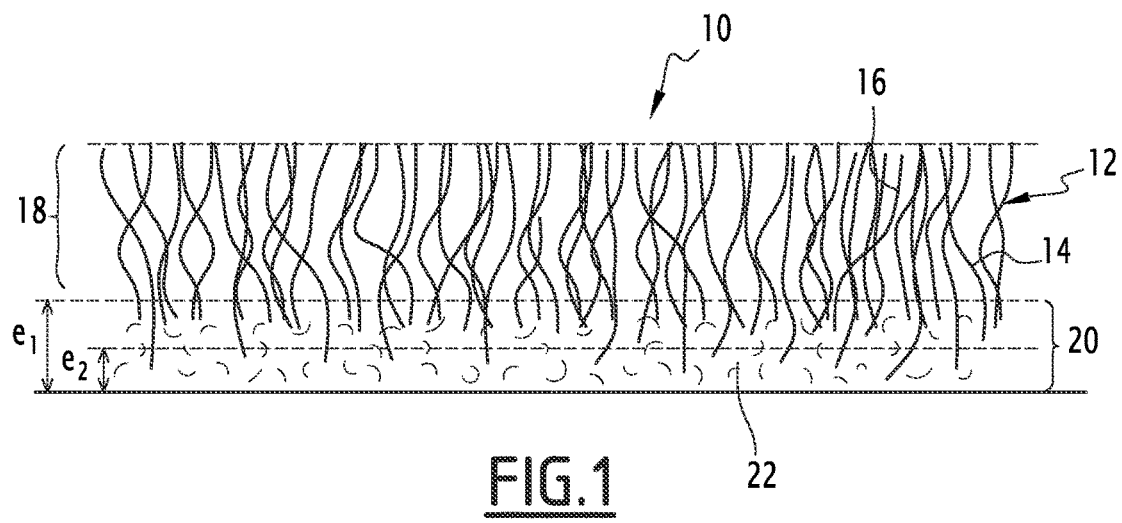
FIG. 1 is a partial cross-sectional view of a first interior trim part of a motor vehicle according to an embodiment of the invention.

A first interior trim part 10 of a motor vehicle constructed according to an embodiment of the invention is illustrated by FIG. 1.

The first part 10 is for example an inner trim mat for a motor vehicle, designed to be placed on the floor or on a wall of the vehicle.

The thickness of the first part 10 is greater than 1 mm and is for example comprised between 3 mm and 8 mm.

The surface density of the first part 10 is less than 2000 g/m2 and in particular comprised between 400 g/m2 and 1000 g/m2.

The first part 10 comprises a web 12 of needlepunched fibers 14, 16, at least partially bound to each other, delimiting a velvet font layer 18 and a back layer forming a base 20.

According to an embodiment of the invention, the first part 10 comprises a binder component 22 formed by a melted thermoplastic polymer penetrating part of the thickness e1 of the base 20.

The part 10 has no latex in the thickness of the web 12.

The web 12 comprises base fibers 14 and binder fibers 16.

The web 12 has a surface density greater than 300 g/m2, and in particular comprised between 400 g/m2 and 1000 g/m2.

The base fibers 14 are randomly distributed. They assume the form of individual loops or fibers, such as trimmed loops.

The base fibers 14 are for example made with a base of thermoplastic polymer, such as polypropylene, polyethylene terephthalate, polyamide, polylactic acid, or mixtures or copolymers thereof.

The length of the base fibers 14 is generally comprised between 40 mm and 100 mm. Their titer is advantageously comprised between 3.3 dtex and 25 dtex.

The binder fibers 16 are at least partially fusible. They generally comprise bi-component fibers for example comprising a core and an outer sheath surrounding the core. The outer sheath has a melting temperature below the melting temperature of the core.

For example, the core is made from polyethylene terephthalate and the sheath from co-polyethylene terephthalate.

Alternatively, the binder fibers 16 are made from a single polymer, having a melting point below the melting point of the base fibers 14, advantageously approximately 50° C. lower than the melting point of the base fibers 14.

In the event the base fibers 14 have a base of polyethylene terephthalate, the binder fibers 16 are for example formed with a base of polypropylene, polyethylene, or co-polyethylene terephthalate, or mixtures or copolymers thereof.

According to at least some embodiments of the invention, the mass content of binder fibers 16, related to the total mass of the fibers 14, 16 in the web 12, is a non-zero value and is less than 15%, and in particular less than 13%. In some cases, this weight content is less than 10%.

The binder fibers 16 are dispersed over the entire web 12 and are present both in the font layer 18 and the base 20, homogenously.

The font layer 18 has a velvety outer appearance. This velvet is made up of fibers 14, 16 randomly distributed in the form of loops or individual fibers (trimmed loops).

The thickness of the font layer 18 is advantageously greater than that of the base 20. The font layer 18 advantageously has a thickness comprised between 2 mm and 5 mm.

The density of the velvet in the font layer 18 is preferably comprised between 0.01 g/cm3 and 0.06 g/cm3. Such a density ensures a pleasing appearance and good abrasion resistance.

This density is for example measured by determining the ratio between the weight of the material obtained by trimming the entire font layer 18 down to the base 20, related to the initial volume of the trimmed layer.

The output of the velvet, made up of the ratio of the weight of the velvet after trimming to the total weight of the part 10 before trimming, is for example comprised between 15% and 40%.

The base 20 is in the form of a flat needlepunched product. Its thickness is advantageously smaller than that of the font layer 18.

The surface mass of the base 20 is greater than 200 g/m2, and is in particular comprised between 200 g/m2 and 800 g/m2.

The base 20 advantageously comprises the base of the fibers forming a U, the ends of which are situated in the font layer 18.

The thermoplastic polymer making up the binder component 22 is positioned in the base 20 over a thickness e2 smaller than that e1 of the base 20, considered from the outer surface of the base 20.

This thermoplastic polymer is for example formed by a polymer or a copolymer (then having a melting temperature below that of the base fibers 14) of the same nature as the polymer making up the base fibers 14.

Alternatively, the thermoplastic polymer has a melting point below that of the base fibers 14. For example, if the base fibers 14 are made from polyethylene terephthalate, the thermoplastic polymer is for example made up of an olefin thermoplastic such as polypropylene, polyethylene, or polylactic acid, polyamide, or polyurethane, or mixtures or copolymers thereof.

The weight percentage of binder component 22, relative to the total mass of the web 12, is less than 25%, and is in particular comprised between 10% and 20%.

As will be seen below, the thermoplastic polymer making up the binder component 22 is advantageously provided in the form of a powder, film, nonwoven, or plastisol or organosol.

In one particular alternative, the thermofusible polymer has a base of bi-component fibers, as described above. The fusible part of the fibers makes up a binder that penetrates the base 20, while the remaining fibrous part is adhered on the back of the base 20 to contribute to its planar cohesion.

In that case, the weight of each web 12 is decreased.

The binder component 22 penetrates the base 20 over a thickness e2 smaller than 50% of the thickness e1 of the base 20, and advantageously over a thickness e2 greater than 10% of the thickness e1 of the base 20.

The penetration thickness e2 of the binder component 22 in the base 20 is for example comprised between 10% and 30% of the thickness e1 of the base 20.

The penetration thickness e2 in the base 20 is controlled owing to the viscosity of the thermoplastic polymer forming the binder component 22, measured by its melt flow index, and the temperature chosen for its melting. This thickness is not controlled by physical means such as calendaring (which can damage the velvet by crushing it). In fact, the penetration thickness advantageously depends on the deposited mass, the intrinsic viscosity of the polymer and the temperature chosen for its activation; the viscosity decreases when the temperature increases.

For example, when the binder component has base of polyolefin (polypropylene or polyethylene), the melt flow index measured by standard ISO 1133: 2005 Method A with a rated load of 0.325 kg at 190° C. is comprised between 50 g/10 mn and 70 g/10 mn.

This value range of the MFI, reflecting the viscosity of the polymer in the melted state, is the appropriate range for the illustrated embodiment of the invention. In other words, depending on the selected polymer, the melting temperature will be adapted to allow the polymer to reach that viscosity range.

Thus, in the case of polyolefins, the temperature chosen for melting is then for example comprised between 110° C. and 190° C.

One appropriate polymer is Licocene™ by the company Clariant.

Because the penetration thickness remains limited, the surface weight of thermoplastic polymer to be introduced into the web 12 is also relatively low. Despite this low penetration, the cohesion of the base 20 remains very satisfactory. The surface density of the thermoplastic polymer is generally comprised between 80 $g/m^2$ and 200 $g/m^2$.

Without wishing to be bound by any theory, the melted thermoplastic material making up the binder component 22 is added to the binder fibers 16 to bind the base of the fibers 14 forming the velvet of this font layer 18, providing good mechanical strength.

It has in fact been noted that the penetration thickness of the binder component 22 necessary for proper behavior was lower when the percentage of fork needles was high on the needle boards. This can be explained by the fact that, as seen above, this type of needlepunching leads to having the base of the velvet fibers (base of the U) essentially on the back side of the base, since that is where the fork needles grasp the fibers that they drive to form the velvet.

Nevertheless, using 100% fork needles may be detrimental to the useful velvet output.

The low percentage of binder fibers 16 in the rest of the base 20 with no binder component 22 surprisingly provides sufficient planar cohesion of the base 20, despite the low mechanical cohesion provided by the needlepunching.

An installation for manufacturing the part 10 is illustrated by FIGS. 3 to 5.

This installation advantageously comprises a station (not shown) for pre-needlepunching a base web to form the web 12, a station 30, shown in FIG. 3, for forming the base 20 and the velvet font layer 18 from the web 12, and a station 32 for applying a binder component 22, shown in FIG. 5.

The pre-needlepunching station is able to provide the precursor web with maximal planar cohesion, while allowing the subsequent formation of velvet. It comprises a conventional felt needle board providing the web with a needlepunching density greater than 100 cps/cm2, and in particular comprised between 100 cps/cm2 and 300 cps/cm2.

The forming station 30 is illustrated by FIG. 3. It is for example made up of a single Dilour™ station, i.e., only comprising one needlepunching head.

It comprises a web 12 unwinder 40, a conveyor 42 comprising a band provided with brushes, a needlepunching apparatus 43, a thermal binding apparatus 44 and a winder 46.

The conveyor 42 comprises an endless belt wound around at least two end rollers 48. The belt is provided with a plurality of brushes 50 delimiting an upper surface 52, on which the web 12 bears.

The band of the conveyor 42 can be driven by at least one roller 48 in order to cause its upper surface 52 to be translated along an axis A-A' for driving the web 12.

The needlepunching apparatus 43 is positioned across from the upper surface 52. It comprises a single needle board 54 able to be deployed vertically toward the surface 52 to pierce the web 12.

The board 54 bears a plurality of needles 56, allowing a needlepunching density advantageously greater than 200 cps/cm2 and in particular comprised between 300 cps/cm2 and 800 cps/cm2.

The majority, and advantageously all, of the needles 56 supported by the board 54 are fork needles, as illustrated by FIG. 6.

At their free piercing end 58, these needles 56 comprise two opposite piercing fingers 60 delimiting an intermediate slot 62, and a bearing heel 64 positioned in the slot 62 to partially close off part of the length of the slots 62.

This type of needle 56 essentially drives the fibers present at the web that it penetrates, unlike crown or felt needles, which drive the fibers present anywhere in the thickness of the web 12.

Surprisingly, the use of these fork needles 56 is not detrimental to the general cohesion of the web 12. In fact, the consolidation treatment surprisingly offsets the planar fragility of the base 20 inherent to this type of needlepunching.

The thermobonding apparatus 44 is for example an air pass-through furnace, an infrared furnace.

It is able to heat the web 12, after needlepunching, to cause the binder fibers 16 to melt at least partially. The temperature within the thermobonding apparatus 44 is for example greater than 90° C., and is in particular comprised between 120° C. and 200° C.

The thermobonding apparatus 44 is placed between the band 42 and the winder 46 to receive the web 12 at the output of the apparatus 43.

In the event the thermoplastic polymer making up the binder component 22 is applied in the form of powder or plastisol or organosol, the application station 32 is illustrated by FIG. 5.

The station 32 then comprises an unwinder 68, a thermoplastic polymer reservoir 70, a dispenser 72, a heating apparatus 74, and a winder 76.

The dispenser 72 is placed across from the base 20 between the unwinder 68 and the heating apparatus 74. It is able, by gravity, to distribute the thermoplastic polymer contained in the reservoir 70 on the base 20.

The heating apparatus 74 is for example an air through-pass furnace, an infrared furnace. It is able to melt the thermoplastic polymer to allow the partial penetration of the thermoplastic polymer in the base 20.

In the alternative illustrated by FIG. 6, when the thermoplastic polymer is provided in the form of a film or a nonwoven, it is wound on a secondary winder 78 and is unwound using an applicator roller 80 on the base 20, upstream from the heating apparatus 74.

Figure 2:
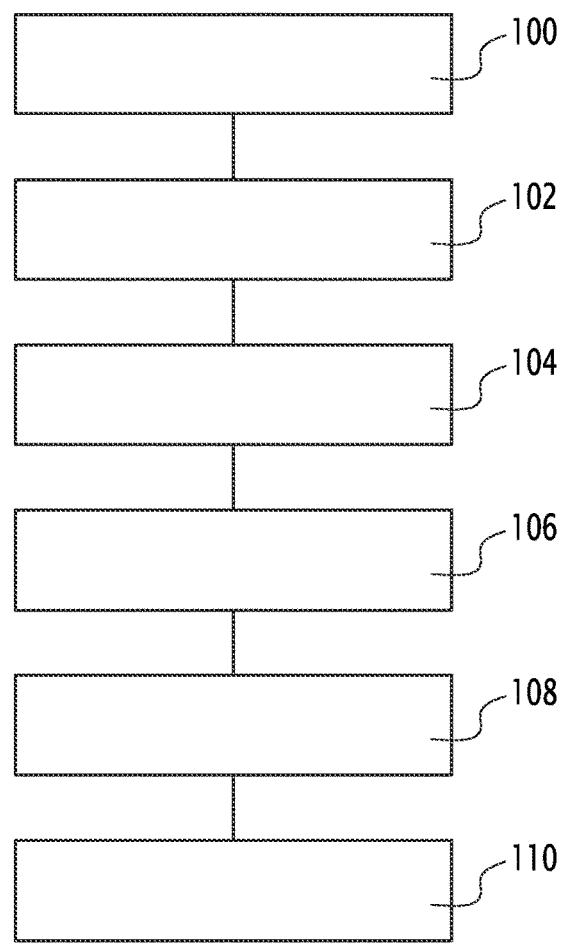
FIG. 2 is a flowchart illustrating the successive steps for carrying out a first method for manufacturing the part of FIG. 1.

A manufacturing method 10 according to an embodiment of the invention will now be described, relative to FIG. 2.

This method advantageously comprises a pre-needlepunching step 100 on the pre-needlepunching station.

It further comprises a step 102, on the station 30, for feeding a fiber web 12 on the conveyor 42 equipped with the brushes 50, a step 104 for needlepunching the fiber web 12 across from the brushes 50 to form the base 20 in contact with the conveyor 42 and the velvet font layer 18 opposite the conveyor 42, and a step 106 for thermobonding the web 12.

The method next comprises a step 108, on the station 32, for introducing the binder component 22 on the base 20, and a step 110 for heating the binder component 22 to cause it to partially penetrate the base 20.

In step 100, a precursor web comprising base fibers 14 and binder fibers 16, with a weight content of binder fibers 16 below 15%, is introduced into the pre-needlepunching station to undergo needlepunching with a needlepunching density greater than 100 cps/cm2, and in particular comprised between 100 cps/cm2 and 300 cps/cm2.

A fiber web 12 is thus obtained and wound.

In the feed step 102, the wound web 12 is placed on the unwinder 40 of the station 30 and is unwound across from the upper surface 52 of the conveyor 42, then through the apparatus 44 up to the winder 46.

In step 104, when it passes over the upper surface 52, across from the brushes 50, the web 12 is pierced by the needles 56 of the board 54 to form the velvet font layer 18 in the zone pierced by the needles 56, and the base 20 across from the brushes 50.

The majority of these needles 56 are fork needles, as described above.

The needles 56 essentially drive the fibers present at the web 12 that they penetrate, by configuring the U-shaped deformed fibers, with the base of the U in the thickness of the base 20.

A base 20 having a surface density comprised between 200 g/m2 and 500 g/m2 is thus obtained. A font layer 18 with a density comprised between 0.01 g/cm3 and 0.060 g/cm3 is formed.

Next, in step 106, the needlepunched web 12 is introduced into the binder apparatus 44 to be heated to a temperature above the melting temperature of the binder fibers 16, in particular above 90° C., and in particular comprised between 110° C. and 190° C. The binder fibers 16 melt at least partially and bind to the base fibers 14.

The web 12 is next wound on the winder 46.

The wound web 12 is next transported to the station 32, and is placed on the unwinder 68. The web 12 is unwound across from the dispenser 72 and the heating apparatus 74 up to the winder 76.

In step 108, the binder component 22 is deposited on the web 12 in the form of a solid thermoplastic polymer, for example in the form of a powder, nonwoven, film, plastisol or organosol. The binder component 22 is just applied on the outer surface of the base 20.

In step 110, the web 12, having the binder component 22 on the outer surface of the base 20, is placed across from the heating apparatus 74 to allow the melting and partial penetration of the thermoplastic polymer making up the binder component 22 in the base 20.

The penetration thickness e2 of the binder component 22 in the base 20 is smaller than the thickness e1 of the base 20, and is in particular comprised between 20% and 30% of the thickness of the base 20.

Advantageously, the U-shaped bases of the fibers of the font layer 18 are then bonded to each other and with the connecting fibers 16 by means of the binder component 22.

It is thus possible to obtain a part 10 with no latex in the thickness of the web 12, with a small binder fibers 16 content level, and nevertheless having a very satisfactory mechanical strength and abrasion resistance.

The low weight percentage of binder fibers 16 in the web 12, and therefore consequently in the velvet 18, allows the part 10 to be shaped with no surface flaws. Despite the low content level of binder fibers 16, the binder component 22 made up of thermoplastic material provides effective mechanical strength, in particular in terms of filamentation and wear.

Furthermore, the overall cost of material necessary to manufacture the part 10 is comparable to or even lower than the cost of a part 10 manufactured with a latex base, and the manufacturing method is simpler, which decreases the overall cost.

The binding obtained using the method is at least as effective as that resulting from the use of latex, while reducing the weight of the web 12.

The consolidated mat according to the method is made entirely from thermoplastic polymers, optionally a polymer and its copolymers, which greatly facilitates recycling thereof.

The invention claimed is:

1. A method for manufacturing an interior trim part of an automotive vehicle, comprising the following steps:
   bringing a fiber web onto a conveyor equipped with brushes, the fiber web comprising base fibers, the fiber web comprising a quantity of strictly more than 0 wt % and of less than 15 wt % of binder fibers that are at least partially fusible;
   needlepunching the fiber web opposite the brushes to form a base in contact with the conveyor and a velvet font layer opposite the conveyor;
   thermobonding the fiber web;
   introducing a binder component on the base, the binder component introduced on the base being a thermoplastic polymer in solid form;
   heating the base after applying the thermoplastic polymer making up the binder component to cause the thermoplastic polymer making up the binder component to penetrate the base over a thickness smaller than the thickness of the base.

2. The method according to claim 1, wherein the binder fibers comprise bicomponent fibers comprising a core and an envelope surrounding the core, the melting point of the envelope being lower than that of the core, or fibers having a melting point lower than the melting point of the base fibers of the fiber web.

3. The method according to claim 1, wherein the thermoplastic polymer making up the binder component is introduced in the form of a powder, film, nonwoven, plastisol and/or organosol.

4. The method according to claim 1, wherein the base fibers are formed with a base of thermoplastic polymer of the same nature as the thermoplastic polymer making up the binder component, the heating step comprising partial melting of the thermoplastic polymer of the base fibers in the base, with no significant melting of the thermoplastic polymer of the base fibers on the font layer.

5. The method according to claim 1, wherein the base fibers are formed with a base of a polymer, the thermoplastic polymer making up the binder component having a melting point lower than the melting point of the polymer of the base fibers.

6. The method according to claim 1, wherein the melt flow index of the thermoplastic polymer making up the binder component is comprised between 50 g/10 mn and 70 g/10 mn.

7. The method according to any one of the preceding claims, wherein the thermobonding of the web of fibers is done before introducing the thermoplastic polymer making up the binder component on the base.

8. The method according to claim 7, wherein the maximum penetration thickness of the thermoplastic polymer making up the binder component in the base after at least partial melting is less than 30% of the thickness of the base.

9. The method according to claim 1, wherein the needlepunching comprises piercing the fiber web using a majority of fork needles.

10. The method according to claim 8, wherein the maximum penetration thickness of the thermoplastic polymer making up the binder component is greater than 10% of the thickness of the base.

11. The method according to claim 9, wherein the needle punching comprises piercing the fiber web using a comb provided with at least 80% fork needles.

* * * * *